(12) United States Patent
Sun et al.

(10) Patent No.: US 8,018,378 B2
(45) Date of Patent: Sep. 13, 2011

(54) SATELLITE NAVIGATION RECEIVER HAVING A CONFIGURABLE ACQUISITION ENGINE

(75) Inventors: Qinfang Sun, Cupertino, CA (US); Wen-Chang Yeh, Hsinchu County (TW)

(73) Assignee: Atheros Communications, Inc., Santa Clara, CA (US)

( * ) Notice: Subject to any disclaimer, the term of this patent is extended or adjusted under 35 U.S.C. 154(b) by 85 days.

(21) Appl. No.: 12/723,993

(22) Filed: Mar. 15, 2010

(65) Prior Publication Data
US 2011/0090112 A1   Apr. 21, 2011

Related U.S. Application Data

(60) Division of application No. 12/261,896, filed on Oct. 30, 2008, now Pat. No. 7,705,778, which is a continuation-in-part of application No. 12/145,918, filed on Jun. 25, 2008.

(60) Provisional application No. 60/946,675, filed on Jun. 27, 2007.

(51) Int. Cl.
*G01S 19/30* (2010.01)
*G01S 19/37* (2010.01)
*G01S 19/34* (2010.01)

(52) U.S. Cl. .......... 342/357.69; 342/357.74; 342/357.77

(58) Field of Classification Search .............. 342/357.69, 342/357.74, 357.77
See application file for complete search history.

(56) References Cited

U.S. PATENT DOCUMENTS

| 6,121,923 A | 9/2000 | King |
| 6,441,780 B1 * | 8/2002 | Rog et al. ................. 342/357.77 |
| 6,480,150 B2 | 11/2002 | Falk et al. |
| 6,611,757 B2 | 8/2003 | Brodie |
| 2004/0202235 A1 | 10/2004 | Kohli et al. |

* cited by examiner

*Primary Examiner* — Thomas H Tarcza
*Assistant Examiner* — Fred H Mull

(57) ABSTRACT

A satellite navigation receiver having a flexible acquisition and tracking engine architecture. The flexible acquisition engine has a reconfigurable delay line that can be used either as a single entity or divided into different sections. Consequently, it can be configured to search different satellite vehicles, a single Doppler frequency, and full CA code in parallel. When configuring the delay line into different sections, each section is used to search a partial CA code. In this configuration, multiple Doppler mode, multiple satellite vehicles, multiple Doppler frequencies, and partial CA code can be searched in parallel. Furthermore, the different sections of the CA code can be time-multiplexed into a correlator, which can then be over clocked to achieve full CA code correlation. The flexible tracking engine includes a number of parallel tracking channels, whereby each individual channel has a number of taps or fingers, which can be used to lock onto different delays. During tracking, one of the taps can be used to lock on to the center of the peak. This leaves the other taps free to be used to perform other functions, such as determining the shape of the peak, detecting earlier arrivals for line of sight component, and obtaining an estimate of the noise floor. The flexible tracking engine is configurable to help acquisition functions, such as fine acquisition, false trigger detection, and/or fast reacquisition.

15 Claims, 9 Drawing Sheets

SATELLITE NAVIGATION RECEIVER HAVING A CONFIGURABLE ACQUISITION ENGINE

CLAIM OF PRIORITY UNDER 35 U.S.C. §120

The present application for patent is a Divisional Application of patent application Ser. No. 12/261,896, entitled "SATELLITE NAVIGATION RECEIVER HAVING CONFIGURABLE ACQUISITION AND TRACKING ENGINES," filed Oct. 30, 2008, pending, which is a continuation-in-part of patent Ser. No. 12/145,918 entitled "HIGH SENSITIVITY GPS RECEIVER," filed Jun. 25, 2008, pending, which claims priority of U.S. Provisional Patent Application 60/946,675, entitled "High Sensitivity GPS Receiver," filed Jun. 27, 2007, and assigned to the assignee hereof and hereby expressly incorporated by reference herein.

BACKGROUND OF THE INVENTION

1. Field of the Invention

Embodiments of the present invention generally relate to satellite navigation receivers. More particularly, embodiments of the present invention pertain to a configurable acquisition and tracking engine architecture for use in GPS receivers to provide enhanced functionalities and improved performance.

2. Description of the Related Art

Satellite navigation systems are made up of multiple, specially designed satellites orbiting Earth. These satellites continuously transmit precise, specific radio frequency (RF) signals that are used to provide navigation information. One widely adopted satellite navigation system is referred to as the Global Positioning System (GPS). By processing the RF signals from four or more GPS satellites, a GPS receiver can determine its current location (longitude, latitude, and altitude) fairly quickly and with a good degree of accuracy.

This remarkable feat is accomplished, in part, by assigning each satellite its own unique coarse acquisition (CA) code. The satellites continuously transmit its own CA code in a spread spectrum, code division multiple access (CDMA) format. When a GPS receiver is first turned on, it searches for signals that match any of the known CA codes that are made up of a complex pattern of specific 1023 pseudo-random bits. This search is typically performed by an acquisition engine. Thereby, a GPS receiver can identify which of the satellites transmitted the received signals by examining the CA code contained in the acquired signal. Furthermore, once a signal is acquired, the CA code phase provides timing information that is used to calculate the distance of the GPS receiver from the satellite. Distance measurements to three satellites can be used to accurately triangulate the GPS's current location. A fourth satellite measurement is used to resolve timing issues. Thereafter, a tracking engine is used to keep tracking the GPS signals so that the GPS receiver can continuously calculate and provide its location information.

Designing acquisition and tracking engines is quite a challenge. This is because the GPS satellites transmit the signals containing the CA codes at only 22 watts of power. The signals must travel over 12,000 miles through space and Earth's atmosphere. By the time the signals are received, they are extremely weak and attenuated. In fact, the power (−130 dBm) of these signals upon reception, are below the noise floor. Furthermore, there are many impediments to receiving signals from GPS satellites. One factor relates to the fact that GPS satellites orbit the earth approximately every twelve hours. Due to the relatively high velocity of the satellites, their signals will always exhibit some Doppler induced distortion. In addition, the transmitted signals operate on substantially a line-of-sight basis. Consequently, they are susceptible to being easily blocked or distorted by buildings and/or terrain. Moreover, line-of-sight signals may be prone to multipath distortion. The GPS band also falls within a crowded frequency spectrum and may be suffer interference issues with signals being transmitted on either side of the GPS band. Other interference sources that may detrimentally impact signal reception are thermal noise, atmospheric propagation interference, etc.

In order to overcome all of these potential impediments, the acquisition and tracking engines tend to be dedicated, highly specialized digital circuits. Their designs are tailored to acquire and track the CA codes as fast as possible and with as much precision as possible to meet certain stipulated cost, size, and power consumption constraints. For example, GPS receivers for use in cell phones are optimized for size and power consumption. In contrast, GPS receivers for survey equipment are optimized for accuracy. The end results are a wide host of rigid, static acquisition and tracking engine designs that have been optimized for the singular purpose of meeting certain one or more target goals in terms of either speed, accuracy, cost, size, and/or power consumption.

The downside to developing highly specialized acquisition and tracking engines is that GPS receivers may encounter different environments. The conditions for receiving the CA code signals are subject to change, sometimes drastically, in a short span of time. This is especially prevalent for mobile applications. Unfortunately, today's dedicated acquisition and tracking engines typically lack the flexibility to adapt to rapidly changing operating conditions and different environments.

SUMMARY

This Summary is provided to introduce a selection of concepts in a simplified form that are further described below in the Detailed Description. This Summary is not intended to identify key features or essential features of the claimed subject matter nor is it intended to be used to limit the scope of the claimed subject matter.

Embodiments of the present disclosure pertain to a satellite navigation receiver having a digital section with a flexible acquisition and tracking engine architecture. In one embodiment, the flexible acquisition engine has a reconfigurable delay line that can be used either as a single entity or divided into different sections. When configuring the delay line as a single entity, referred to as single Doppler mode, the full CA code is searched. This single Doppler mode can be implemented to search different satellite vehicles, a single Doppler frequency, and full CA code in parallel. When configuring the delay line into different sections, referred to as multiple Doppler mode, each section is used to search a partial CA code. In the multiple Doppler mode, multiple satellite vehicles, multiple Doppler frequencies, and partial CA code can be searched in parallel. Furthermore, the different sections of the CA code can be time-multiplexed into a correlator, which can then be over clocked to achieve full CA code correlation.

In another embodiment, the flexible tracking engine includes a number of parallel tracking channels. Individual channels each have a given number of taps or fingers, which can be used to lock onto different delays. During tracking, one of the taps can be used to lock on to the center of the peak. This leaves the other taps free to be used to perform other functions. For example, one or more taps can be used to determine the shape of the peak to compute the discriminator for the delay lock loop for fine timing adjustment. One or more taps can be used to detect earlier arrivals for line of sight component. Furthermore, one or more taps can optionally be used to correlate with wrong timing to obtain an estimate of the noise floor. In addition, this flexible tracking engine can be used to help perform acquisition functions, such as fine acquisition, false trigger detection, or fast reacquisition. Meanwhile, the acquisition engine can continue running uninterrupted.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Figure 1:
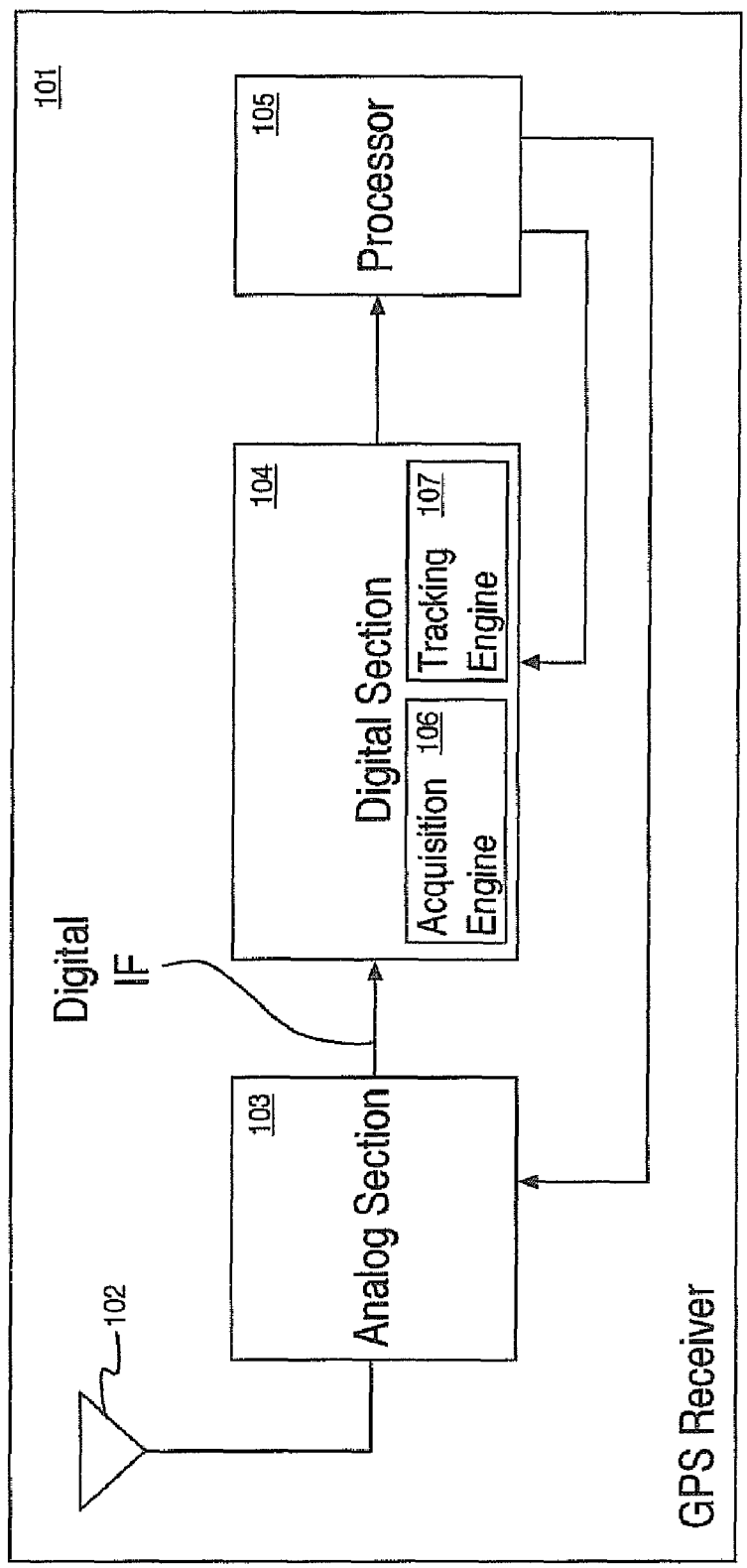
FIG. 1 is a diagram of a GPS receiver.

FIG. 1 is a conceptual diagram of a GPS receiver 101. The GPS receiver includes, without limitation, an antenna 102, an analog section 103, a digital section 104, and a processor 105. The antenna 102 is coupled to the analog section 103. GPS satellite signals are received by the antenna 102 and are coupled to an input of the analog section 103. The analog section 103 processes the GPS satellite signals and produces a digital intermediate frequency (IF) signal by sampling the GPS satellite signal with an analog to digital converter (ADC). In one embodiment, the sample rate may be approximately 16 mega-samples per second (Ms/s). The digital IF signal is coupled to the input of the digital section 104. The digital section 104 uses the digital IF signal to acquire and track satellites from within the GPS satellite constellation. This is accomplished by the acquisition engine 106 and tracking engine 107, which are part of the digital section 104. The acquisition engine 106 generates the acquisition data, and the tracking engine generates the tracking data which are input to the processor 105. The processor 105 may be a central processing unit CPU, a microprocessor, a digital signal processor, or any other such device that may read and execute programming instructions. The processor 105 analyzes the acquisition and tracking data to determine navigation information such as location and velocity.

Furthermore, the processor 105 also configures the acquisition and tracking engines 106 and 107 of digital section 105. This feature provides greater flexibility to better adapt to current operating environments, which optimizes overall performance. In general, the acquisition engine has a reconfigurable delay line that can be used either as a single entity or divided into different sections. When the delay line is configured as a single entity, it operates in a "single Doppler mode." This single Doppler mode can be implemented to search the full CA code is searched, or it can be used to search different satellite vehicles, a single Doppler frequency, and full CA code in parallel. When the delay line is configured into different sections, it operates in a "multiple Doppler mode." This multiple Doppler mode can be configured whereby each section searches a partial CA code. In the multiple Doppler mode, multiple satellite vehicles, multiple Doppler frequencies, and partial CA code can be searched in parallel. Furthermore, the different sections of the CA code can be time-multiplexed into a correlator, which can then be over-clocked to achieve full CA code correlation.

Likewise, the processor 105 can also configure the tracking engine 107. In one embodiment, the tracking engine 107 includes a number (e.g., sixteen) of parallel tracking channels. Individual channels each have a given number (e.g., seven) of taps or fingers, which can be used to lock onto different delays. During tracking, one of the taps can be used to lock on to the center of the peak. The other taps can be used to perform other functions, such as determining the shape of the peak to compute the discriminator for the delay lock loop for fine timing adjustment; detecting earlier arrivals for line of sight component; intentionally correlating with wrong timing to obtain an estimate of the noise floor. Thereby, this flexible tracking engine can be used to help acquisition (e.g., fine acquisition, false trigger detection, or fast reacquisition). The flexible, configurable acquisition and tracking engines are described in greater detail below.

Figure 2:
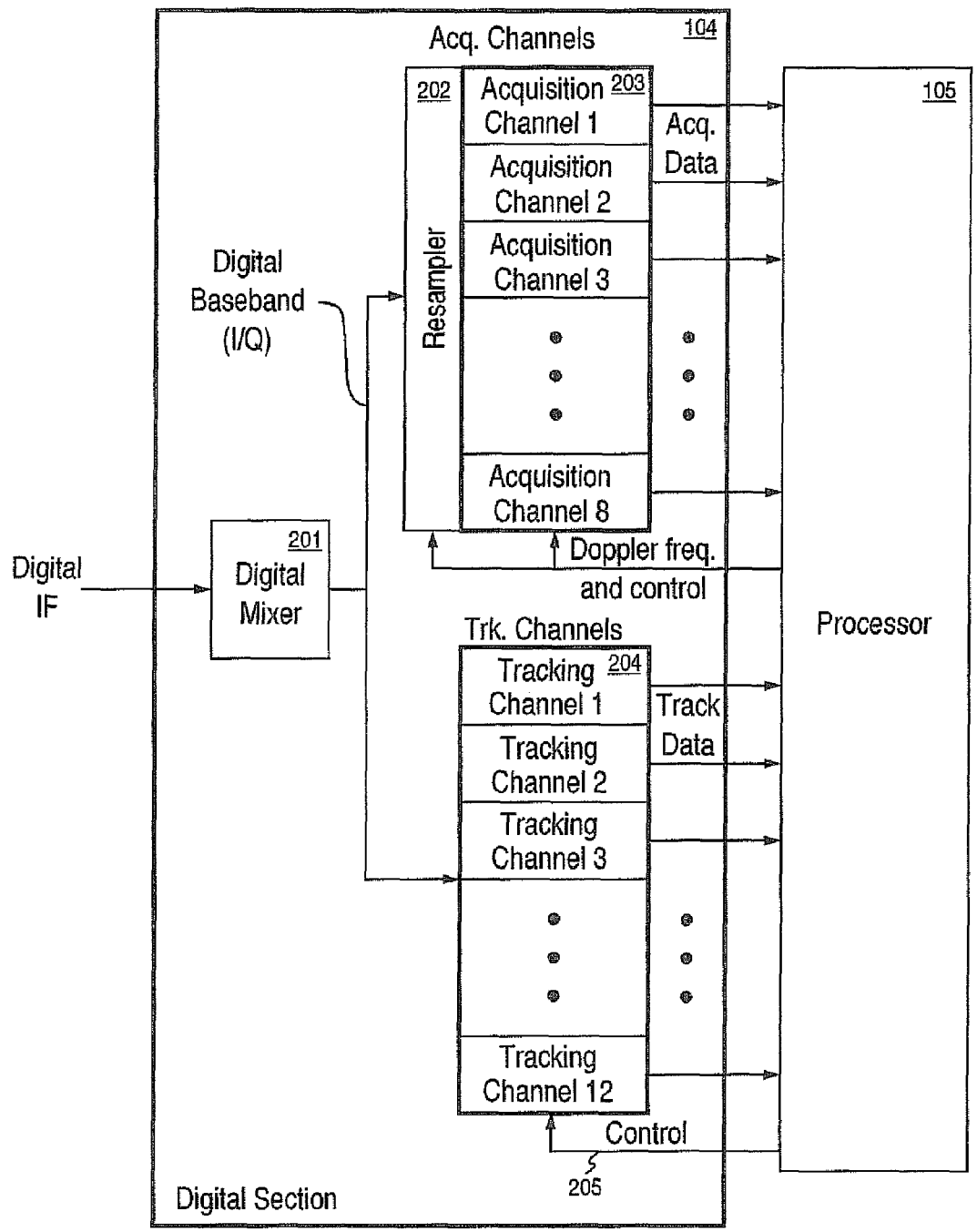
FIG. 2 is a diagram of the digital section and the processor of the GPS receiver.

FIG. 2 is a more detailed conceptual diagram of the digital section and the processor of the GPS receiver shown in FIG. 1. The digital section 104 includes, without limitation, a digital mixer 201, a resampler 202, acquisition channels 203, and tracking channels 204. The digital IF signal from the analog section shown in FIG. 1 is coupled to the digital mixer. The digital mixer 201 mixes the digital IF signal with a digital local oscillator (LO) signal (not shown) and produces a digital baseband signal. In one embodiment, the digital baseband signal may include both in-phase (I) and quadrature (Q) components. Since, in one embodiment, the digital IF signal is sampled at a rate of approximately 16 Ms/s, the digital baseband signal is also approximately 16 Ms/s. The digital baseband signal is coupled to both the resampler 202 and the tracking channels 204. In one embodiment, the digital section 104 includes eight acquisition channels 203 and twelve tracking channels 204. In operation, each acquisition and tracking channel may be assigned to process data for a particular GPS satellite. For example, an acquisition channel may be used to analyze GPS satellite data and determine if a particular satellite is within view of the GPS receiver while a tracking channel may be used to track a different GPS satellite that may have been previously acquired. Operation of the resampler 202 and the acquisition channels 203 are described in greater detail in conjunction with FIGS. 3, 4 and 5 while operation of the tracking channel is described in greater detail in conjunction with FIG. 6. Again, the acquisition and tracking data are coupled to the processor 105. The processor may execute programming instructions stored within a memory (not shown) to control and configure the resampler 202, the acquisition and the tracking channels 203 and 204. This can be done based on the analysis of the acquisition and tracking data. One or more control signals are sent on the control line(s) 205.

Figure 3:
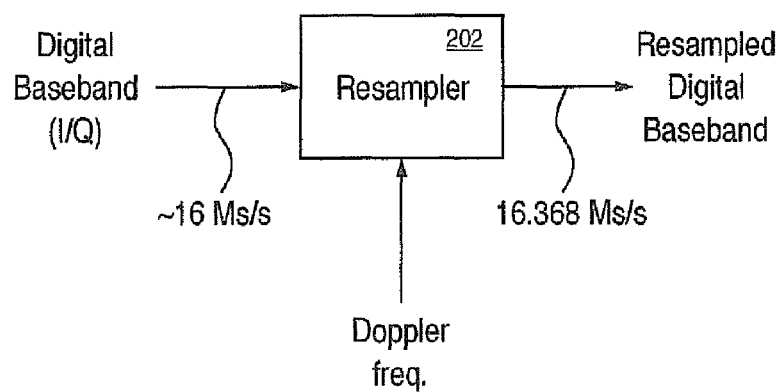
FIG. 3 is a diagram of a resampler of the GPS receiver.

FIG. 3 is more detailed conceptual diagram of the resampler 202 of the GPS receiver previously described and shown in FIG. 2. As shown, the digital baseband signal is coupled to an input of the resampler 202. The resampler resamples the digital baseband signal and produces a resampled digital baseband data with a sample rate that is substantially equal to 16 times the chip rate of 1.023 Ms/s, or approximately 16.368 Ms/s. In one embodiment, the resampler 202 may resample the digital baseband signal data with a multi-tap, finite impulse response (FIR) filter whose coefficients may be determined by, in part, a Doppler frequency associated with a GPS satellite. In another embodiment, the FIR filter may be a two-point linear interpolator. The Doppler frequency may be an estimated Doppler frequency used during GPS satellite signal acquisition and may be supplied by the processor. The estimated Doppler frequency may be selected from a list of all possible Doppler frequencies. For example, the estimated Doppler frequency may be the lowest Doppler frequency on the list. Subsequent Doppler frequency estimates may be relatively higher frequencies. GPS satellite signal acquisition, which includes estimating Doppler frequencies, is described in greater detail below in conjunction with FIGS. 7 and 8. The output of the resampler 202 is coupled to all acquisition channels.

Figure 4:
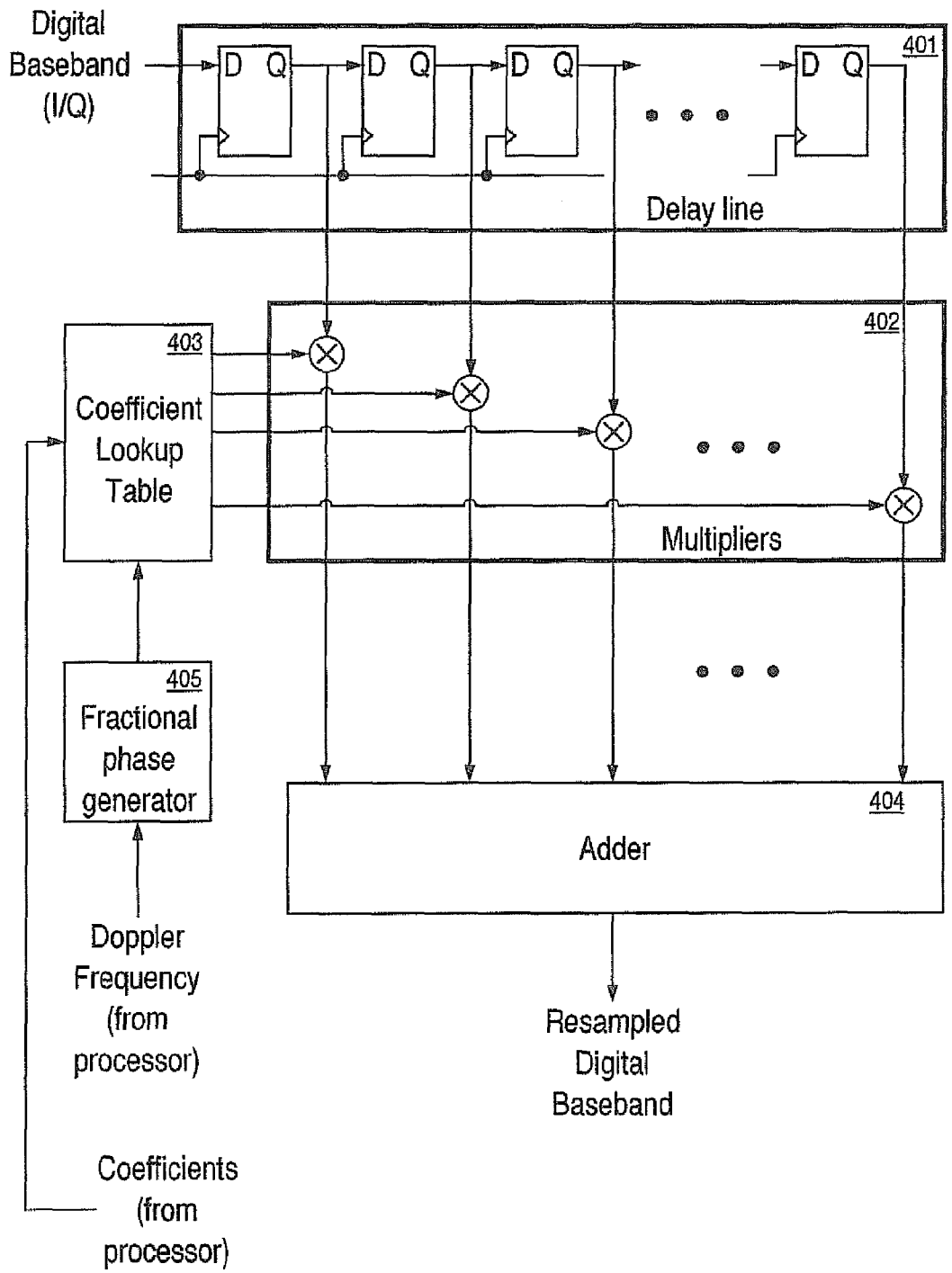
FIG. 4 shows an exemplary embodiment of the internal circuitry of a resampler.

FIG. 4 shows an exemplary embodiment of the resampler, according to the specification. The resampler includes, without limitation, a delay line 401, multipliers 402, a coefficient lookup table 403, an adder 404 and a fractional phase generator 405 configured as a fir filter. The resampler resamples data from a first data rate to a second data rate by multiplying old data points by coefficients producing a weighted sum. Coefficients may be determined by the processor and loaded into the coefficient lookup table 403. The fractional phase generator 404 determines which coefficients are used by analyzing factors such as the estimated Doppler frequency and the relationship between the input and output data rate. The fractional phase generator 404 selects the coefficients from the coefficient lookup table 403. Although a single bit data path is shown in FIG. 4, the actual data path may be many bits wide. For example, the flip-flops may be realized with multi-bit registers. In one embodiment, the data path is wide enough to support the data from the digital mixer in FIG. 2.

Digital baseband data from the digital mixer is coupled to the input of the delay line 401. The delay line 401 may include two or more registers configured in a daisy-chain fashion as shown. The coefficient lookup table 403 supplies the coefficients to one input of each of the multipliers 402. Data from the delay line 401 is coupled to the other input of each of the multipliers 402. The outputs of the multipliers 402 are coupled to the adder 404. The output of the adder 404 is resampled digital baseband data. The estimated Doppler frequency is coupled to the input of the fractional phase generator 404. The output of the fractional phase generator 404 is coupled to the coefficient lookup table 403. The fractional phase generator 404 and the coefficient lookup table 403 determine the coefficients used in the resampling computation. In one embodiment, the coefficient lookup table may be random access memory (RAM). Using a RAM to implement the lookup table advantageously lets the user easily modify the exact coefficients used in the FIR filter.

Figure 5:
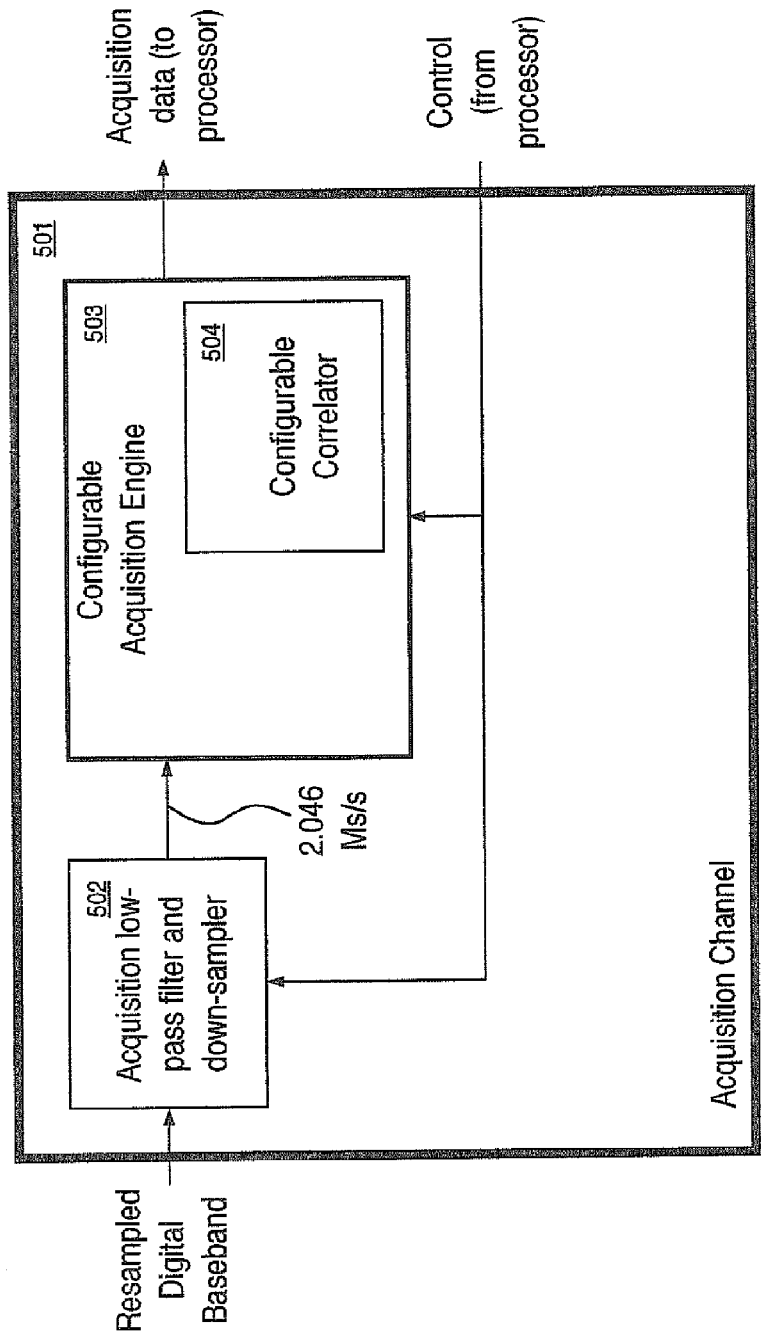
FIG. 5 shows a more detailed diagram of an acquisition channel of the GPS receiver.

FIG. 5 shows a more detailed conceptual diagram of an acquisition channel of the GPS receiver described above and shown in FIG. 2. The acquisition channel 501 includes, without limitation, an acquisition low-pass filter and down-sampler 502. It also includes a configurable acquisition engine 503. The resampled digital baseband data from the resampler is coupled to the input of the acquisition low-pass filter and down-sampler 502 that reduces the data rate of the output of the resampler to a rate substantially equal to twice the chip rate or 2.046 Ms/s. Down-sampling from 16.368 Ms/s to 2.046 Ms/s may produce aliased GPS data; therefore, the output of the resampler is low-pass filtered prior to down sampling to remove out-of-band data that may result in aliasing. Down-sampling may be implemented by filtering and sample dropping or just sample dropping. In one embodiment, the down-sampler may be implemented with a multi-tap FIR filter whose coefficients may be determined, in part, by estimated Doppler information supplied by the processor. The output of the down-sampler is coupled to the configurable acquisition engine 503. In one embodiment, the functionality of the resampler may be combined with the functionality of the acquisition low-pass filter and down-sampler into a single unit. In that embodiment, the resampler and the acquisition low-pass filter and down-sampler 502 may be replaced by a single unit. Such a unit may offer some area savings compared to the discrete approach described here. The acquisition engine "acquires" a GPS satellite by correlating the resampled digital baseband data with known CA codes using a configurable correlator 504. The operation of the acquisition engine and the configurable correlator is described in greater detail in conjunction with FIGS. 6, 7 and 8 below.

Figure 6:
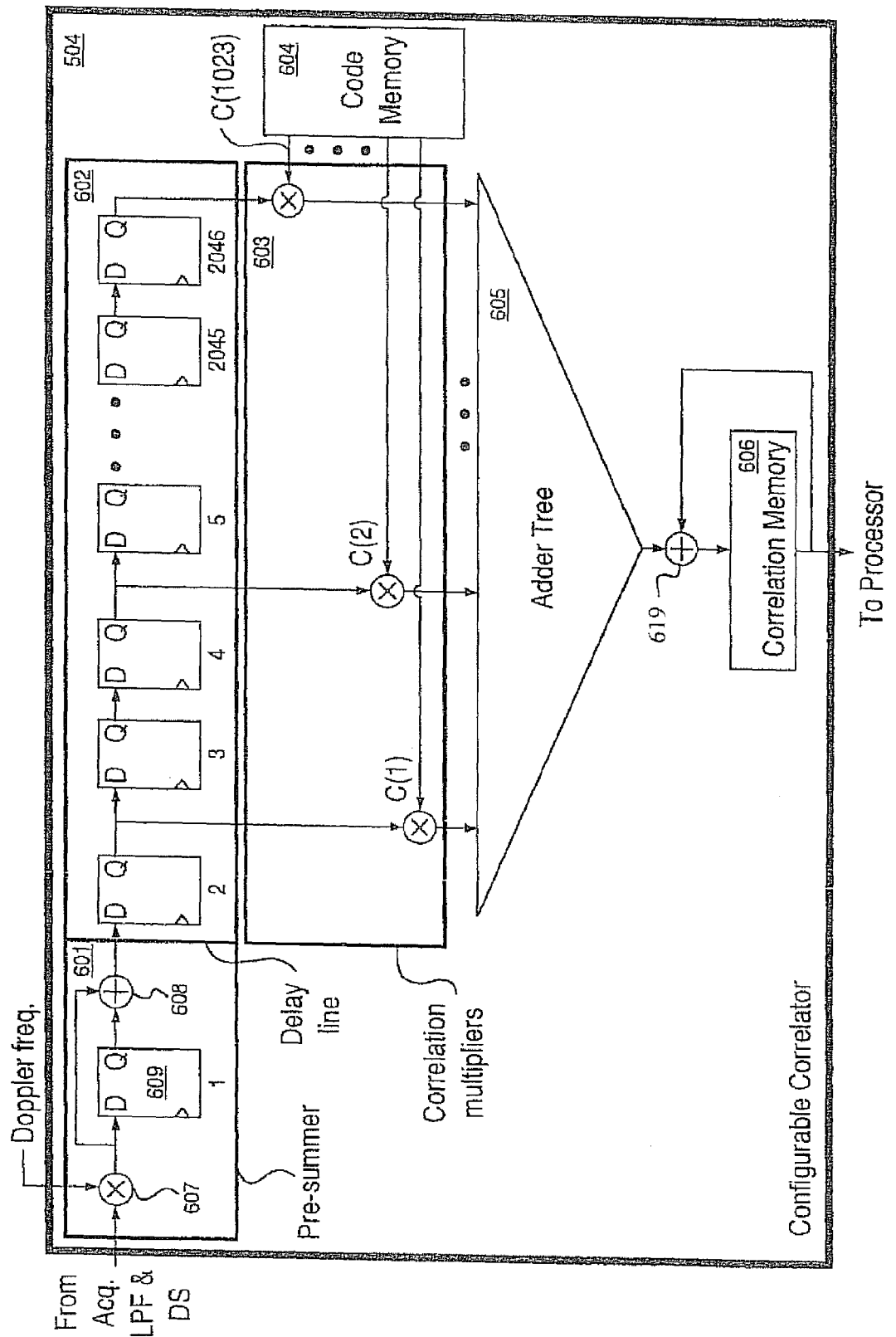
FIG. 6 is a diagram of one embodiment of a configurable correlator.

FIG. 6 is a diagram of one embodiment of a configurable correlator 504 according to the specification. The configurable correlator 504 includes, without limitation, a pre-summer 601, a delay line 602, correlation multipliers 603, code memory 604, an adder tree 605 and correlation memory 606. The configurable correlator 504 correlates GPS satellite data with a CA code, a particular code phase and an estimated Doppler frequency in order to produce a correlation value. Generally, a larger correlation value indicates a stronger relationship between these four elements. Although FIG. 6 shows the width of the data path as a single bit wide, the actual data path width may be made as wide as required to accommodate the data in the acquisition channel, which may be related to the width of the ADC.

The resampled digital baseband data from the acquisition low-pass filter and down-sampler is coupled to the pre-summer 601. As shown, the pre-summer 601 includes a mixer 607, an adder 608 and a register 609. The mixer 607 removes the Doppler effects by multiplying a phase ramp value determined by the estimated Doppler frequency with the resampled digital baseband data. One input of the mixer is the resampled digital baseband data and the other input of the mixer is the estimated Doppler frequency. The output of the mixer is a Doppler corrected baseband digital data stream at 2.046 Ms/s. In one embodiment, the estimated Doppler frequency may be supplied by the processor. The output of the mixer 607 is coupled to the input of the register 609 and one input of the adder 608. The output of the register 609 is coupled to another input of the adder 608. The pre-summer 601 adds together two data samples of the Doppler corrected, digital baseband data stream. Using the pre-summer advantageously reduces the number of correlation multipliers needed to correlate a complete CA code with one-half chip precision. Since the CA code includes 1023 chips, 1023 correlation multipliers may be used for correlation. Without the pre-summer 601, 2046 correlation multipliers would be needed to correlate the 1023 chips (there are 2046 samples representing the 1023 chips since the baseband digital data stream is at twice the chip rate). The pre-summer 601 effectively reduces the number of correlation multipliers to 1023. Since the baseband digital data stream is 2.046 Ms/s, the resolution of the correlator is one-half chip period. Correlating data points positioned between chip periods (i.e., one-half chip periods) may provide relatively finer correlation granularity.

The output of the pre-summer 601 is coupled to the input of the delay line 602. In one embodiment, the delay line is an array of 2045 registers where the output of one register is coupled to the input of another register in a daisy-chain fashion as shown in FIG. 6. The output of every other register of the delay line is coupled to one input of one of the 1023 multipliers included in the correlation multipliers 603. The other input of each of the multipliers 603 is coupled to the code memory 604. The code memory 604 may store different CA codes representing different GPS satellites as well as different code phases that may be determined by different arrangements of the CA codes in the code memory. In one embodiment, the correlation multipliers 603 may be implemented with exclusive-or (XOR) devices. A single bit wide data path may implement the XOR functionality with a single XOR gate. If the width of the data path is greater than a signal bit, the XOR devices may include gates and other components as required to implement the XOR functionality.

The outputs of the correlation multipliers 603 are coupled to the adder tree 605. In one embodiment, the top of the adder tree 605 (i.e., the first stage of the adder tree) may be only a few bits wide (i.e., wide enough to accommodate the data width of the data from the delay line multiplied by the CA code). Toward the bottom of the adder tree 605 (i.e., the final stage of the adder tree), the width of the adder tree may be increased to accommodate the full sum with the desired precision. The output of the adder tree 605 is coupled to one input of the adder 619. The output of the correlation memory 606 is coupled to another input of the adder 619. The output of the adder 609 is coupled to the correlation memory 606. This arrangement between the correlation memory 606 and the adder 619 allows correlation results to be easily accumulated, if desired. In a single Doppler mode, a search can be performed on different space vehicles (SV's), a single Doppler frequency, and full CA code in parallel.

In one embodiment, the configurable correlator may be over-clocked. In one over-clocked embodiment, the fundamental clock rate is greater than the data rate. In another embodiment, overclocking refers to resetting one or more components so that it runs faster than normal. In a multiple Doppler mode, multiple SV's, multiple Doppler frequencies, and partial CA code are searched in parallel. The over-clocking can be applied to the multiple Doppler mode to search multiple SV's, multiple Doppler frequencies, and full CA code in parallel. The difference is that the different sections of the CA code is time-multiplexed into the correlator, and the correlator runs faster to achieve full CA code correlation. This multiple Doppler mode with full CA code search is useful and efficient in many circumstances. For example, there may exist data regarding the Doppler frequency of each SV but not the sub-ms timing. In this case, searching multiple SV's with the same Doppler or different Doppler but partial CA code, is less efficient than searching multiple SV's with different Doppler and full CA code. In one configuration, multiple CA codes may be correlated to a single set of data samples, thereby reducing the time required to correlate different satellite CA codes or code phases to an incoming GPS satellite data stream.

In another embodiment, the configurable correlator may be over-clocked and partial CA codes correlated with a partial adder tree. In such a configuration, the correlation memory may store a partial sum of a first partial correlation that may be added to the sum of a second partial correlation.

A traditional acquisition engine may include many one-tap correlators, one to correlate each possible code phase of interest. Each one-tap correlator may include an adder many bits wide (i.e., full precision to accommodate the full correlation value). Because there may be many such one-tap correlators, the overall area may be very large compared to the area of the adder tree structure set forth above.

Figure 7:
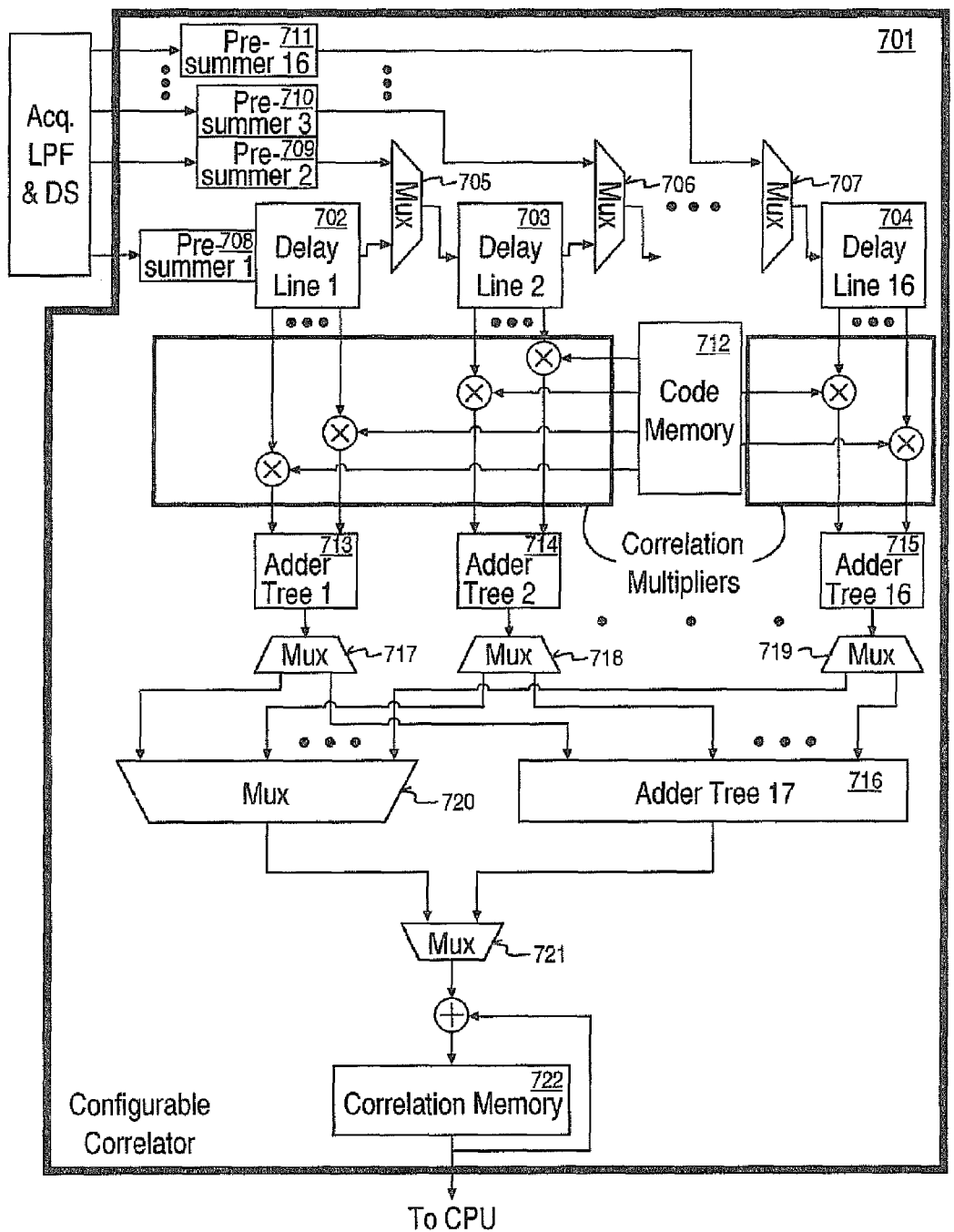
FIG. 7 shows an embodiment whereby a configurable correlator is used to correlate multiple partial code phases instead of a single CA code phase.

FIG. 7 shows an embodiment whereby a configurable correlator 701 is used to correlate multiple partial code phases instead of a single CA code phase of 1023 chips. This configuration is particularly useful for GPS satellite reacquisition. Consider an event when a previously acquired GPS satellite is temporarily obscured from the view of the GPS receiver. Since a particular satellite has been previously acquired, the CA code of that satellite is known. However, the exact code phase may not be known. To reacquire the GPS satellite, the code phase may be quickly determined by only correlating a portion of the complete CA code. To correlate portions of the CA code, the delay line may be divided into sections (e.g. sections 702-704) with multiplexers 705-707. The multiplexers 705-707 may separate the delay line into sections sized for correlating partial CA codes. Alternatively, the multiplexers 705-707 may enable all the delay line sections 702-704 to be daisy chained to, thereby, operate similarly to the single delay line of FIG. 6. Furthermore, the adder tree may be decentralized and distributed so that either partial CA codes or a complete CA code may be correlated.

The configurable correlator 701 also includes, without limitation, pre-summers 708-711, code memory 712, adder trees 713-716, multiplexers 717-721 corresponding to the adder trees, and correlation memory 722. In one embodiment, there are sixteen delay line sections, sixteen pre-summers and seventeen adder trees. More generally, the configurable correlator includes n delay line sections, n pre-summers and n+1 adder trees.

The delay line of FIG. 7 is divided into multiple sections (e.g., sixteen sections). With the exception of the last delay line section (shown as delay line section n in FIG. 7), the output of each delay line section is coupled to one input of an associated delay line input multiplexer. The output of each of the pre-summers is coupled to another input of the delay line input multiplexers. In one embodiment, the pre-summers of FIG. 7 are substantially similar to the pre-summers of FIG. 6. Finally, the output of each delay line input multiplexer is coupled to the input of another delay line section. This arrangement of delay line input multiplexers, delay lines and pre-summers allows the delay line to be configured as a long delay line or as several smaller delay lines.

When configured as a long delay line, the delay line sections form a delay line that may be similar in length to the delay line of FIG. 6. In one embodiment, each delay line section includes thirty-three taps whereby each tap includes two registers. A delay line section with thirty-three taps provides approximately 32 us of correlation timing range, which may be sufficient for GPS satellite reacquisition. The sixteen delay line sections form a delay line of 528 taps. This is approximately one-half of the number of taps described in FIG. 6. The delay line length may be extended by overclocking For example, if the delay line is twice over-clocked, the effective length becomes 1,056 taps which is approximately the delay line length shown in FIG. 6. As shown, the outputs of the delay line sections are coupled to respective inputs of the correlation multipliers. Code memory is coupled to the other inputs of the correlation multipliers. Again, in one embodiment, correlation multipliers may be implemented with (XOR) devices as described above in conjunction with FIG. 6. The outputs of the correlation multipliers are coupled to the inputs of the adder trees. In one embodiment, the adder tree of FIG. 6 may be partitioned such that the upper portion of the adder tree of FIG. 6 is divided into n sections whose inputs are coupled to the outputs of the correlation multipliers. The lower portion of the adder tree of FIG. 6 is included in the adder tree n+1.

The outputs of the adder tree 1 through adder tree n are each coupled to a respective input of the adder tree output multiplexers. The adder tree output multiplexers couple outputs from the adder trees to either the n-to-one selector multiplexer or to the adder tree n+1. The outputs of the n-to-one selector multiplexer and the adder tree n+1 are coupled to inputs of a two-to-one selector multiplexer. The output of the two-to-one selector multiplexer is coupled to one input of an adder. The output of the adder is coupled to the input of the correlation memory. The output of the correlation memory is coupled to the second input of the adder and the processor.

The configurable correlator of FIG. 7 may be configured to correlate a complete CA code, which is useful when acquiring a GPS satellite. When configured to correlate a complete CA code, data from the acquisition low-pass filter and down-sampler is coupled to the first pre-summer (pre-sum 1). In this configuration, the other pre-summer units are not used and their outputs are ignored. The output of the first pre-summer is coupled to delay line section 1. The delay line input multiplexers are configured to couple the output of one delay line section to the input of another delay line section forming a relatively longer delay line capable of supporting the length of a complete CA code. The outputs of the delay line sections are coupled to the correlation multipliers in a manner similar to that described in FIG. 6. The CA code from the code memory is also coupled to the correlation multipliers and the outputs of the correlation multipliers are coupled to adder tree sections 1 though n. In this configuration, the adder tree sections 1 through n function similarly to the upper portion of the adder tree described in FIG. 6. The adder tree output multiplexers couple the outputs of the adder tree sections 1 through n to adder tree section n+1, thereby configuring the adder tree sections 1 through n+1 to add the outputs of the correlation multipliers and produce a correlation value similar to the correlation number produced by the configurable correlator of FIG. 6. The two-to-one selector multiplexer couples the output of adder tree n+1 to correlation memory and an adder. The CPU may access correlation values through the output of the correlation memory.

The configurable correlator of FIG. 7 may also be configured to correlate a partial CA code that is useful when re-acquiring a GPS satellite. A satellite may need reacquisition when the data stream from a GPS satellite, which has been previously acquired, becomes temporarily lost or interrupted. Since the GPS satellite was previously acquired, the CA code for a particular satellite is known; however, the code phase (i.e., the relationship between the CA code and the local clock) may have changed due to Doppler effects, relative motion and/or the performance of the local clock source. In order to determine the code phase, only a portion of the CA code may need correlation. The configurable correlator of FIG. 7 may be configured to correlate one or more different code phases of a given CA code.

To correlate one or more partial CA codes, the acquisition low-pass filter and down-sampler is coupled to the input of all the pre-summers. As was described in conjunction with FIG. 6, the pre-summers correct for the Doppler effect and add two samples of the GPS data stream together. The output of each of the pre-summers is coupled to a respective input of each of the delay line input multiplexers. The delay line input multiplexers couple the output of the pre-summers to respective delay line sections. Thus, in this configuration, the delay line sections 1 through n are independent of each other and each delay line section may correlate a separate partial CA code. The length of the delay line section determines the length of the partial CA code that is correlated. Thus, in one configuration, the n delay line sections may correlate n partial CA codes. In an alternate configuration, two or more delay line sections may be daisy-chained enabling the correlation of longer partial CA codes. The configurable correlator supports mixed partial CA code lengths in which differing numbers delay line sections are daisy-chained. For example, delay line section 1 may correlate a first partial CA code, delay line sections 2 and 3 may correlate a second partial CA code and delay line sections 4, 5 and 6 may correlate a third partial CA code.

The output of the correlation multipliers are coupled to the adder tree sections 1 through n. The adder tree output multiplexers couple the outputs of the adder trees to respective inputs of the n-to-one selection multiplexer. The n-to-one selection multiplexer couples one output from one of the first n adder trees though the two-to-one selector multiplexer to the correlation memory. This configuration advantageously correlates many different partial CA code phases relatively quickly.

Figure 8:
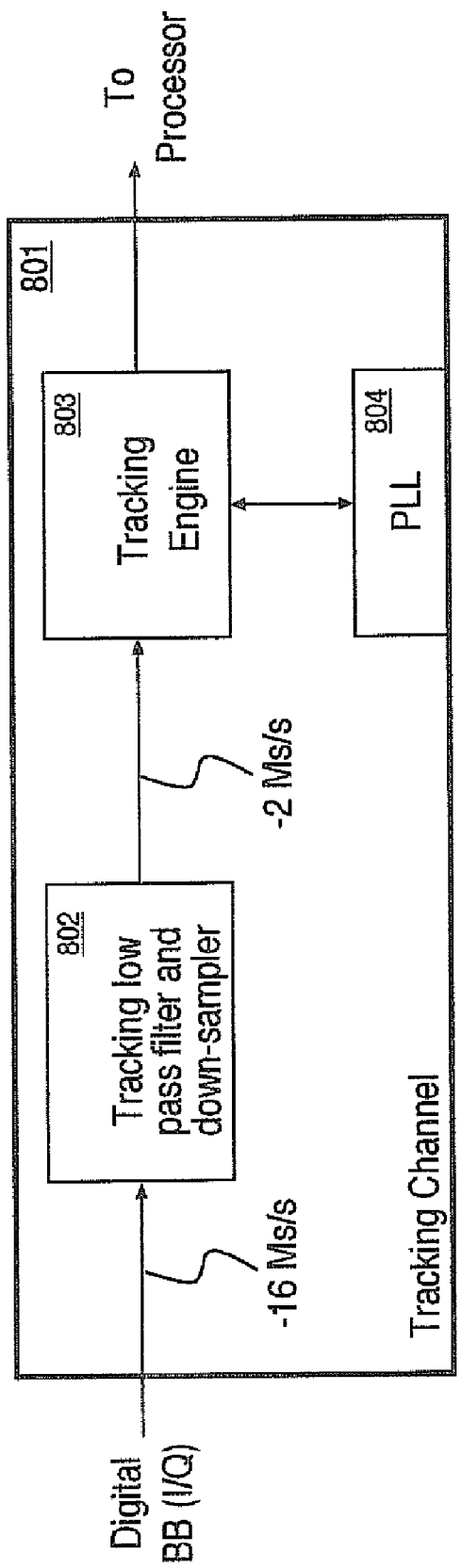
FIG. 8 shows a block diagram of a tracking channel.

FIG. 8 shows a block diagram of a tracking channel 801. The tracking channel 801 includes, without limitation, a tracking low-pass filter and down-sampler 802, a phase lock loop (PLL) block 804 and a tracking engine 803. The digital baseband signal from the digital mixer of FIG. 2 is coupled to the input of the tracking low-pass filter and down-sampler 802 that reduces the data rate of the output of the digital mixer by approximately one-eighth. In one embodiment, operation of the tracking low-pass filter and down-sampler 802 may be substantially similar to operation of the acquisition low-pass filter and down-sampler described in FIG. 5. Since the data rate from the digital mixer is approximately 16 Ms/s, the output rate of the low-pass filter and down-sampler 802 is approximately 2 Ms/s. In one embodiment, the output rate of the low-pass filter and down-sampler 802 is greater than twice the chip rate or 2.046 Ms/s. An output rate that does not have an integer relationship to the chip rate may help track GPS satellites by distributing data sampling points at different times within the chip periods. The low-pass filtered, down-sampled data is coupled to the input of the tracking engine 803. The PLL block 804 is coupled to the tracking engine 803. In one embodiment, the PLL block 804 may be implemented as a combination of a PLL and a delay lock loop (DLL) or simply a PLL. The tracking engine tracks GPS satellites by converging on both the Doppler frequency of the received GPS signal and the code phase of the CA code received from a selected satellite.

Figure 9:
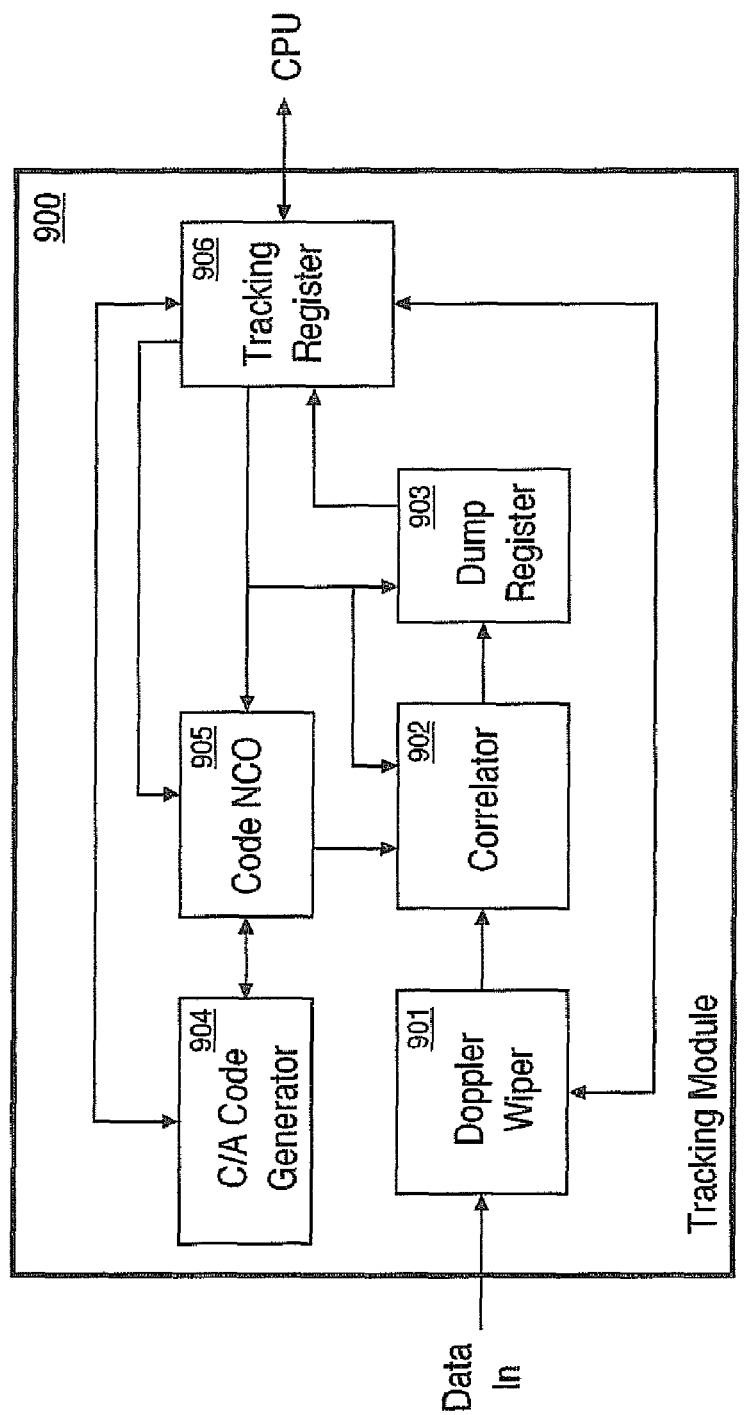
FIG. 9 shows an embodiment of a flexible tracking module.

FIG. 9 shows an embodiment of a flexible tracking module 900. The I and Q data signals from the Doppler wiper 901 are input to the configurable correlator 902. Configurable correlator 902 correlates the I and Q data signals against the correlation coefficients presented by the code NCO 905. The code NCO 905 determines the different code coefficients based on the code supplied by the C/A code generator 904 and the tap spacings specified by the track register 906. By applying a number of different taps, the code can be controllably shifted or delayed. This results in different correlations. This multiple-tap configuration is advantageous in many ways. For example, given that each of the sixteen tracking channels discussed above has seven taps or fingers, these taps can be used to lock on to seven different delays. Having seven time delays enables a search of one Doppler and seven co-phases at the same time. This means that during tracking, one of the taps can be locked to the center of the peak. Meanwhile, the other taps can be used to: determine the shape of the peak to compute the discriminator for the delay lock loop (DLL) for fine timing adjustment; detect earlier arrivals for line-of-sight (LOS) component; and/or correlate with wrong timing to obtain an estimate of the noise floor. Also, the spacing between the taps may not be determined by the sampling rate alone. Integer and/or fractional tap spacing may be obtained by configuring the code NCO 905 and the track register 906. In one embodiment, the fractional and integer distance between tap fingers and the center tap may be configured through a control register, which in turn may control the code NCO 905.

Furthermore, the tracking channels can be used to perform fine acquisition, false trigger detection, and/or fast reacquisition. When using the tracking channels to perform fine acquisition, a small range of Doppler frequency and code phase is searched close to the coarse acquisition peak in order to reduce the estimation error. False trigger detection entails checking which of the top peaks are truly a correlation peak by searching a small range around those peaks using a longer integration period. Fast reacquisition initiates a search within a small range around where the signal was before it was lost a short time ago. In other words, a search is performed within a small range of parameters corresponding to the last known location of the SV. The final results from these various functions are temporarily stored in tracking register 906 and output to the CPU. Commands from the CPU to the tracking module 900 are also temporarily stored in the tracking register 906.

The common feature of these acquisition operations by the flexible tracking engine is their limited range of search. Each tracking channel can search for one Doppler frequency and seven code phases in parallel. By configuring the tracking channels to cover the desired search range, these operations can be executed by the tracking channels. This is more flexible and efficient than using the acquisition engine to perform tasks. In addition, the acquisition engine can keep running the more heavy-duty search without interruption. Thus, this basic structure of a tracking channel is smaller and consumes less power and computing resources compared to the acquisition engine. By utilizing the tracking engine to perform some of the acquisition functions, overall efficiency is improved while performance is improved.

Although illustrative embodiments of the invention have been described in detail herein with reference to the accompanying figures, it is to be understood that the invention is not limited to those precise embodiment. They are not intended to be exhaustive or to limit the invention to the precise forms disclosed. As such, many modifications and variations will be apparent. Accordingly, it is intended that the scope of the invention be defined by the following Claims and their equivalents.

What is claimed is:

1. A satellite navigation receiver comprising:
an analog section for performing analog signal processing on a received satellite navigation signal;
an acquisition engine coupled to the analog section that acquires the satellite navigation signal;
a delay line coupled to the acquisition engine, wherein the delay line is configured to be operational in a first mode as a single entity used to search the full CA code and in a second mode divided into sections with each section used to search a partial CA code; and
a processor coupled to the acquisition engine that processes data from the acquisition engine to provide location information.

2. The satellite navigation receiver of claim 1, wherein the acquisition engine searches different SV's, a single Doppler frequency, and full CA code in parallel.

3. The satellite navigation receiver of claim 1, wherein the acquisition engine searches multiple SV's, multiple Doppler frequencies, and partial CA code in parallel.

4. The satellite navigation receiver of claim 1, wherein the acquisition engine searches multiple SV's, multiple Doppler frequencies, and full CA code in parallel.

5. The satellite navigation receiver of claim 4, wherein portions of the full CA code is time multiplexed into a correlator and the correlator is over-clocked.

6. The satellite navigation receiver of claim 1 further comprising:
a tracking engine coupled to the analog section that tracks the satellite navigation signal, wherein the tracking engine comprises a plurality of tracking channels, each tracking channel having a configurable plurality of taps that can be used to lock on to a plurality of different delays, wherein a spacing between the taps is determined by a desired search range, wherein the tracking engine is coupled to the processor, wherein the processor processes data from the tracking engine to provide location information.

7. The satellite navigation receiver of claim 6, wherein the tracking engine performs functions that can be used to perform at least one of fine acquisition, false trigger detection, and fast reacquisition.

8. A method of determining a location of a satellite navigation receiver comprising:
receiving a navigation signal from a satellite;
performing analog signal processing on the navigation signal;
correlating the navigation signal to either a full CA code or a partial CA code, wherein a single delay line is used to correlate the navigation signal to the full CA code and a section of the delay line is used to correlate the navigation signal to the partial CA code; and
generating location information based on a correlated navigation signal.

9. The method of claim 8 further comprising correlating the navigation signal to a plurality of partial CA codes by using a plurality of sections of the delay line.

10. The method of claim 8 further comprising searching a plurality of SV's, a plurality of Doppler frequencies, and partial CA code in parallel.

11. The method of claim 8 further comprising searching a plurality of SV's, a plurality of Doppler frequencies, and full CA code in parallel.

12. A Global Positioning System (GPS) receiver comprising:
a means for receiving a navigation signal from a satellite;
a means for performing analog signal processing on the navigation signal;

a means for correlating the navigation signal to either a full CA code or a partial CA code, wherein a single delay line is used to correlate the navigation signal to the full CA code and a section of the delay line is used to correlate the navigation signal to the partial CA code; and a means for generating location information based on a correlated navigation signal.

13. The GPS receiver of claim 12, wherein the means for correlating the navigational signal further comprises correlating the navigation signal to a plurality of partial CA codes by using a plurality of sections of the delay line.

14. The GPS receiver of claim 12, wherein the means for correlating the navigational signal further comprises searching a plurality of SV's, a plurality of Doppler frequencies, and partial CA code in parallel.

15. The GPS receiver of claim 12, wherein the means for correlating the navigational signal further comprises searching a plurality of SV's, a plurality of Doppler frequencies, and full CA code in parallel.

* * * * *